Figure 1:
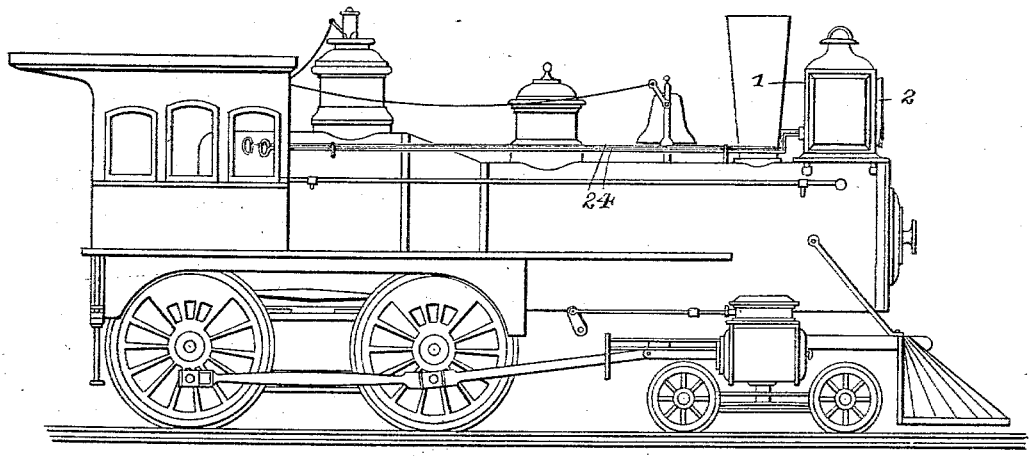

(No Model.) 2 Sheets—Sheet 1.

M. J. DAVIS.
LOCOMOTIVE HEADLIGHT.

No. 552,989. Patented Jan. 14, 1896.

Witnesses
Chas. A. Ford,
R. W. Smith

Inventor
Moses J. Davis,

By his Attorneys.
C. A. Snow & Co.

(No Model.) 2 Sheets—Sheet 2.
M. J. DAVIS.
LOCOMOTIVE HEADLIGHT.
No. 552,989. Patented Jan. 14, 1896.
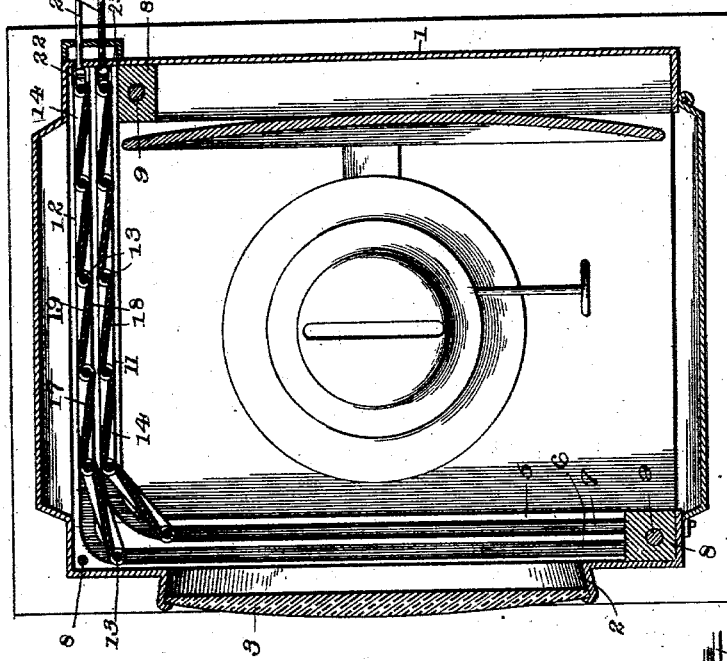
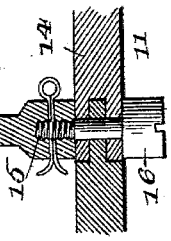
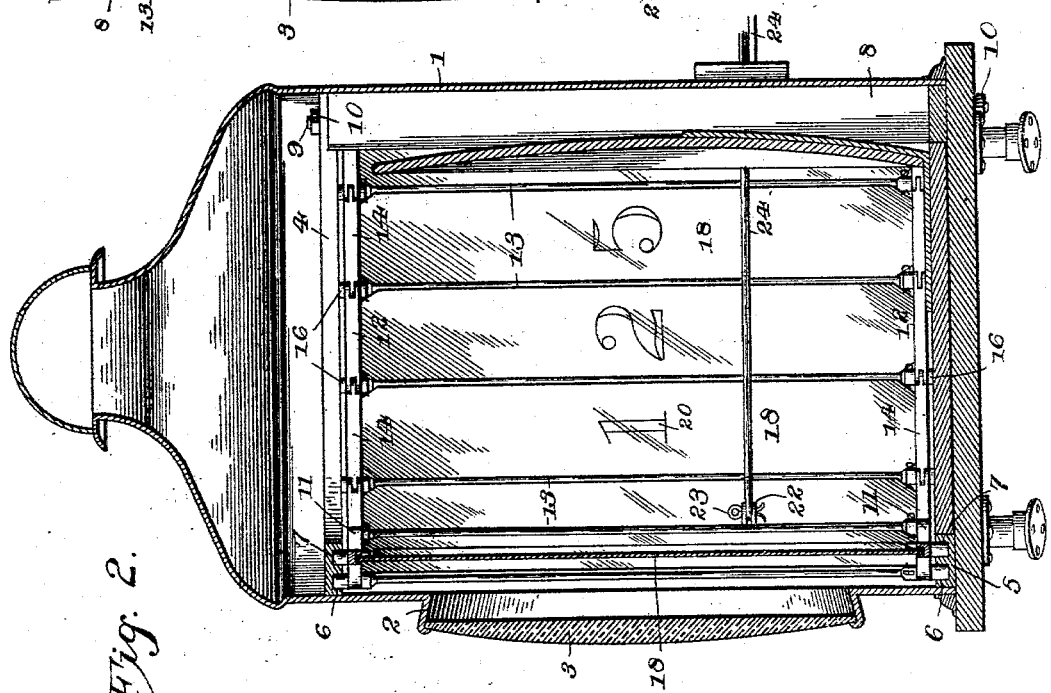
Witnesses
Chas. A. Ford.
R. M. Smith
Inventor
Moses J. Davis,
By his Attorneys.
C. A. Snow & Co.

UNITED STATES PATENT OFFICE.

MOSES J. DAVIS, OF SAN ANTONIO, TEXAS, ASSIGNOR OF ONE-FOURTH TO HENRY J. DAVIS, OF PUEBLO, COLORADO.

LOCOMOTIVE-HEADLIGHT.

SPECIFICATION forming part of Letters Patent No. 552,989, dated January 14, 1896.

Application filed April 30, 1895. Serial No. 547,644. (No model.)

*To all whom it may concern:*

Be it known that I, MOSES J. DAVIS, a citizen of the United States, residing at San Antonio, in the county of Bexar and State of Texas, have invented a new and useful Locomotive Three-Way Headlight, of which the following is a specification.

This invention relates to an improvement in locomotive-headlights.

The object of the invention is to provide a three-way headlight for locomotives, which shall be provided with a pair of slides or movable screens of different colors for signaling purposes, and to provide the same with means, under the control of the engineer in the locomotive-cab, whereby they are adapted to be quickly and easily manipulated for moving them across the lens or away from the same when desired.

A further object of the invention is to construct said slides or screens and the guiding and supporting frame therefor in such manner that they may be applied to headlights now in use without the necessity of building an entirely new headlight-case in order to get the advantages of my invention.

The object of the improvements herein described is to avoid many of the accidents which happen on railroads, due to the lack of proper signaling apparatus, by providing a reliable and efficient signaling-headlight by the use of which railroading in general will be made much plainer, affording greater protection to the lives of the employés of the road, the traveling public, and the freight, rolling-stock, and other property.

With these objects in view the invention consists in the combination, with an angular or L-shaped grooved frame adapted to be disposed within the case of an ordinary headlight for locomotives, of one or more slides or screens traveling in said grooved frame and provided with colored glass or other suitable material; in the means for operating and controlling the movements of said slides or screens; in the manner of constructing said slides or screens in folding or hinged sections and providing for their proper guidance across the lens; also in certain novel features and details of construction and arrangement of parts, as hereinafter fully described, illustrated in the drawings, and pointed out in the claims.

Figure 4:
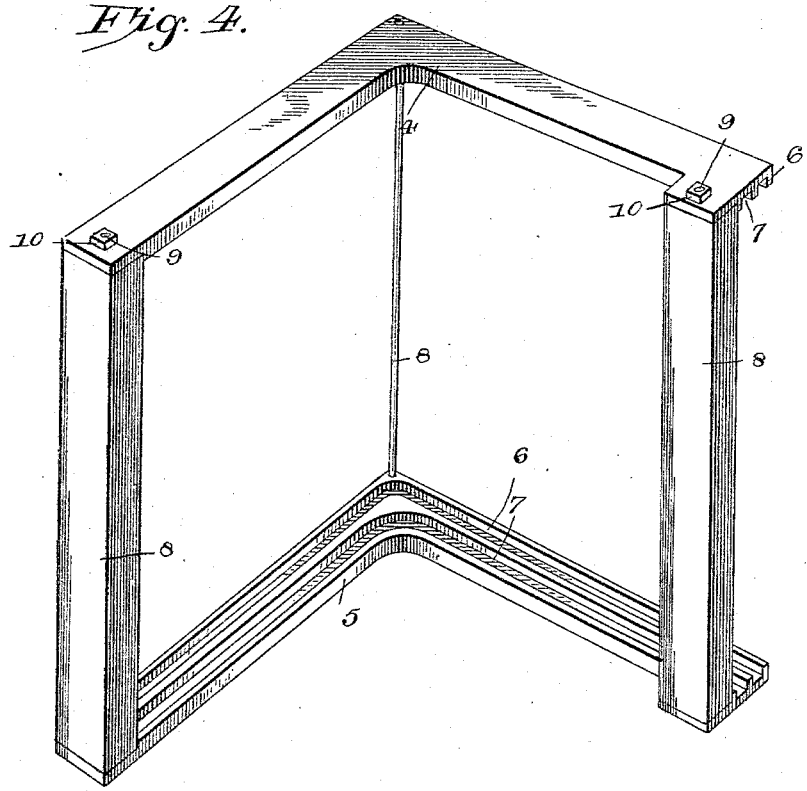
Figure 5:
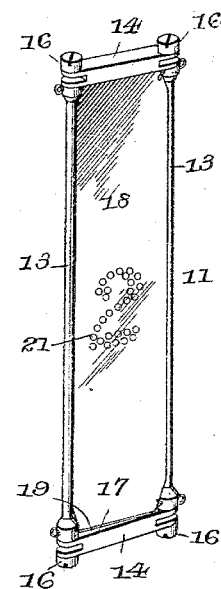

In the accompanying drawings, Figure 1 is an outlined side view of a locomotive, showing the improved headlight attached and the means for operating the different-colored slides from the engine-cab. Fig. 2 is a vertical longitudinal section through the improved headlight complete. Fig. 3 is a horizontal section through the same. Fig. 4 is a detail perspective view of the internally-arranged frame and its grooved tracks. Fig. 5 is a similar view of one of the slides or movable screen-sections. Fig. 6 is an enlarged sectional view through the tongue-and-grooved ends of two adjacent screen-sections, showing the manner in which they are pivoted together by means of the trunnions which work in the grooved tracks.

Similar numerals of reference indicate corresponding parts in the several figures of the drawings.

One great trouble that has been experienced in railroading is that on account of the presence of the flagman being required at the rear end of trains it is difficult for him to get forward in time to flag the head end of the train, and even when he is forward he cannot, perhaps, run as fast as a long freight-train while heading into clear or siding. It also often happens that the flagman's small white or red lantern at night is blinded by the powerful headlight, so that a freight-train is often struck in the side by not getting into clear or siding quickly enough.

A practical experience of seventeen years has demonstrated the necessity for an efficient signaling-headlight, which I will now proceed to describe.

Referring to the drawings, 1 designates a rectangular metallic box or case, such as is ordinarily used for a locomotive-headlight, being provided with the usual forwardly-extending annular flange 2 for the reception of lens 3. The case is further provided with the usual base, by means of which it is secured in place on the locomotive, and with a ventilating top, as shown in the drawings. An angular or L-shaped open frame (illustrated in detached view, Fig. 4) is provided, being adapted to fit snugly within the rectangular case 1 and to extend around two sides thereof, as indicated in the horizontal sectional view, Fig. 3. This frame comprises an upper and a lower L-shaped plate, and both of said plates (designated by the numerals 4 and 5) are provided upon their inner adjacent faces with parallel grooves or channels 6 and 7, said grooves being curved at the corners or elbows of said plates 4 and 5. These L-shaped tracks or plates are connected at their ends and elbows by means of interposed posts or standards 8, and said frame as a whole is secured to the base within the case 1 by means of through-bolts 9, passing preferably through the posts or standards 8 and downward through the base of the case 1, beyond which they are secured by means of the usual nuts 10, thus insuring a strong and durable construction.

11 and 12 designate a pair of slides or screens, one of which is provided with a red glass and the other with green glass or else some opaque substance, according to the desire of the railroad and its code of signals. The slides or screens 11 and 12 are similar in construction, each being formed in a number of equal sections which are hinged together in a manner that will now be described. A number of upright slender posts or rods 13 are connected at their upper and lower ends by means of short links or bars 14, which are tongued and grooved at their adjacent ends and provided with aligned perforations for the reception of the shank 15 of a trunnion 16. The trunnions 16 are located above and below the jointed slide or frame, forming extensions of the vertical posts or rods 13, and lying in the grooves 6 and 7. The inner extremity of the shank 15 is threaded to engage a corresponding threaded socket in the upper or lower end of each vertical post or rod 13.

By means of the construction just described it will be seen that each slide or screen frame is composed of a number of equal sections, which are hinged together and provided with upwardly and downwardly extending trunnions resting in the grooved tracks 4 and 5, whereby said slides are guided in their movements from end to end of said tracks. The short links or bars 14 are provided with grooves or recesses in their inner adjacent faces, as indicated at 17, adapting them to receive the upper and lower edges of panels 18 of colored glass or other colored translucent or opaque material. It is preferred to line said grooves with sheet-rubber or other suitable material, as shown at 19, which will prevent the wearing of said links or the breaking or rattling of the glass panel. The upright posts or rods 13 are made as slender as practicable, in order to prevent the shutting off or blinding of too much light. The guiding-trunnions 16 are preferably made round in cross-section, and just a little smaller in diameter than the width of the grooves in which they travel. These trunnions are also made slightly greater in height than the depth of the grooves, in order that the links or bars 14 may clear the faces of the grooved tracks or L-shaped plates 4 and 5. The slides or screens are thus firmly held in place between the upper and lower tracks and effectually prevented from becoming displaced. In order to more readily insert the trunnions 16 the outer ends thereof are keyed or slitted, adapting them to be applied with a screwdriver, and in order to prevent the unthreading of said trunnions the shank of the trunnion and the adjacent end of the vertical post or rod are provided with horizontally-aligned perforations, into which a split pin or cotter is inserted. The glass panels 18 are preferably arranged at an angle, so that one vertical edge will lie within the adjacent vertical post or rod and the opposite edge will lie outside of the post or rod adjacent thereto, although this arrangement may be varied if desired.

Where glass panels are employed the number of the engine may be ground thereon in a manner well understood, as indicated at 20. Where the material of said panel is opaque, the number of the engine may be formed by providing said panels with a number of fine perforations 21 arranged in such order and relation as to produce the desired effect.

The slides or screens 11 and 12 are each provided at one end with one or more perforated ears or lugs 22 and a pin 23, thus providing for the attachment of the inner ends of a pair of rods or stout wires 24, extending through perforations in the rear wall of the case 1, and thence rearwardly to the interior of the cab, where they are provided with suitable handles within easy reach of the engineer. By the construction above described either one of said slides or screens may be moved across the face of the lens, or they may be both withdrawn, thus leaving the lens unobstructed. In use, when a train comes to a meeting-point the engineer should throw the red slide or screen across the lens until the train is into clear or siding, whether heading in or backing in, thus illuminating the surrounding landscape, such illumination being clearly discernible by the engineer of a train approaching from the opposite direction, thus avoiding accident. When into clear or siding the red slide is withdrawn and the green or opaque slide moved across the lens, indicating that the main track is unobstructed. If the first train to arrive has the right to the main track the engineer of such train should move the red slide before the lens and leave it there until the approaching train has arrived and started into the siding. The coming train will thus be advised that the main track is occupied.

The device described will afford a great deal of protection to life and property and will be found very efficient and reliable in practice.

It will be apparent that various changes in the form, proportion, and the minor details of construction may be resorted to without departing from the principle or sacrificing any of the advantages of this invention.

Having thus described the invention, what is claimed as new, and desired to be secured by Letters Patent, is—

1. A head-light attachment, comprising an L-shaped track frame corresponding to two sides of the head-light case and removably inserted in said case, one or more flexible sliding color screens comprising each a series of translucent panels hinged together and mounted in said frame, and means for moving said screens independently across the lens, substantially as and for the purpose specified.

2. A head-light attachment, comprising an L-shaped frame corresponding to two sides of the head-light case and formed with a series of guide grooves extending substantially in parallelism, one or more flexible sliding screens mounted within the grooves of said frame and each consisting of a plurality of open rectangular frames hinged together at their contiguous meeting edges and adapted to be moved in a train longitudinally of said grooves, and a corresponding series of translucent colored panels inserted in and carried by said open rectangular frames, and means connected with the terminal frame of each screen for moving such screen, as a whole, across the lens, substantially as and for the purpose set forth.

3. In a locomotive head light, the combination with the rectangular case thereof, of the grooved tracks extending around two sides thereof, one or more sliding screens composed of several hinged sections covered with colored glass or other translucent or opaque material, and a plurality of trunnions carried by said sliding screens and engaging said grooved tracks, substantially as described.

4. In a head light, the combination with a suitable case, of the grooved track located therein, the sliding screen frames movable lengthwise of said track and composed of a number of pivoted sections, and a series of panels of colored glass or other translucent material mounted as to their edges in grooves in said pivoted sections, substantially as specified.

5. In a head light, a rectangular case, and an internally arranged track extending upon two sides thereof, in combination with a sliding screen frame made in several sections pivoted together by means of tongued and grooved upper and lower bars, a plurality of trunnions provided with threaded and perforated shanks for engaging the vertical posts or rods, and the split pins engaging aligned perforations in said shanks and posts or rods, substantially as and for the purpose specified.

6. In a head light, an inclosing case, and a grooved track internally arranged within said case, in combination with one or more sliding screens composed of a number of sections hinged together, and one or more rods or wires coupled to said sliding screens and extending through perforations in the rear wall of said case, and thence into the engine cab within convenient reach of the engineer, substantially as set forth.

In testimony that I claim the foregoing as my own I have hereto affixed my signature in the presence of two witnesses.

MOSES J. DAVIS.

Witnesses:
W. W. FORESTER,
W. E. RAYNOR.